United States Patent
Peterson et al.

(10) Patent No.: US 12,519,903 B2
(45) Date of Patent: Jan. 6, 2026

(54) SEGMENTATION OF VIDEO FEED DURING VIDEO CONFERENCE

(71) Applicant: Lenovo (Singapore) Pte. Ltd., Singapore (SG)

(72) Inventors: Nathan Peterson, Morrisville, NC (US); Russell Speight VanBlon, Morrisville, NC (US); Arnold Weksler, Morrisville, NC (US); Mark Delaney, Morrisville, NC (US); John C. Mese, Morrisville, NC (US)

(73) Assignee: Lenovo (Singapore) Pte., Singapore (SG)

( * ) Notice: Subject to any disclaimer, the term of this patent is extended or adjusted under 35 U.S.C. 154(b) by 286 days.

(21) Appl. No.: 18/191,302

(22) Filed: Mar. 28, 2023

(65) Prior Publication Data

US 2024/0333864 A1 Oct. 3, 2024

(51) Int. Cl.
| H04N 7/15 | (2006.01) |
| H04L 65/403 | (2022.01) |
| H04N 5/262 | (2006.01) |
| H04N 7/14 | (2006.01) |

(52) U.S. Cl.
CPC ............. *H04N 7/15* (2013.01); *H04L 65/403* (2013.01); *H04N 5/2624* (2013.01); *H04N 5/2628* (2013.01); *H04N 7/147* (2013.01)

(58) Field of Classification Search
None
See application file for complete search history.

(56) References Cited

U.S. PATENT DOCUMENTS

| | | | |
|---|---|---|---|
| 9,798,933 B1 * | 10/2017 | Meisser ................. | H04N 23/90 |
| 9,819,877 B1 * | 11/2017 | Faulkner ................ | H04N 7/147 |
| 11,082,661 B1 * | 8/2021 | Pollefeys ................. | H04N 7/15 |
| 2011/0047478 A1 * | 2/2011 | Ellsworth ............... | G06F 9/543 |
| | | | 715/744 |
| 2014/0074471 A1 * | 3/2014 | Sankar .................... | G10L 17/02 |
| | | | 704/E17.001 |
| 2018/0063482 A1 * | 3/2018 | Goesnar ................. | H04N 23/58 |
| 2019/0199967 A1 * | 6/2019 | Tangeland ............. | H04N 7/152 |
| 2019/0373216 A1 * | 12/2019 | Cutler .................... | H04N 7/147 |
| 2022/0269882 A1 * | 8/2022 | Proschowsky ......... | G06V 40/10 |
| 2022/0368550 A1 * | 11/2022 | Abhishek .............. | H04L 65/403 |
| 2024/0054786 A1 * | 2/2024 | Andresen ............. | H04N 5/2628 |
| 2024/0064271 A1 * | 2/2024 | Murata .................. | H04N 7/152 |
| 2024/0214232 A1 * | 6/2024 | Reszka ................ | G06V 40/178 |
| 2024/0223853 A1 * | 7/2024 | Wada ............... | H04N 21/44218 |

* cited by examiner

*Primary Examiner* — Quoc D Tran
(74) *Attorney, Agent, or Firm* — John M. Rogitz; John L. Rogitz

(57) ABSTRACT

In one aspect, a first device includes a processor and storage. The storage includes instructions executable by the processor to facilitate a video conference and to segment a camera feed into first video and second video as part of facilitating the video conference. The first video shows a first person but not a second person, the second video shows the second person but not the first person, and the camera feed shows both the first and second people. The instructions are also executable to use the first video and the second video as part of the video conference. This might include transmitting the first and second video to a second device, and/or controlling the display of the second device to concurrently but separately present the first and second video.

20 Claims, 5 Drawing Sheets

SEGMENTATION OF VIDEO FEED DURING VIDEO CONFERENCE

FIELD

The disclosure below relates to technically inventive, non-routine solutions that are necessarily rooted in computer technology and that produce concrete technical improvements. In particular, the disclosure below relates to segmentation of a camera's video feed during a video conference.

BACKGROUND

Video conferencing has become increasingly common in today's computer-centric remote work environment. However, certain people might still attend a video conference together by meeting in a conference room to then confer with other people at other locations. But as recognized herein, the video feed from the conference room that is streamed to the other conferees would typically show a single feed from a single camera in the room, which is not optimal as people in the conference room might not be clearly seen and certain visual information may be lost. As also recognized herein, remote conferees may not even know who exactly is attending the video conference since each person in the conference room would typically not login to the conference with their own individual device and login information. There are currently no adequate solutions to the foregoing computer-related, technological problem.

SUMMARY

Accordingly, in one aspect a first device includes at least one processor and storage accessible to the at least one processor. The storage includes instructions executable by the at least one processor to facilitate a video conference and to, as part of facilitating the video conference, segment a camera feed into first video and second video. The first video shows a first person but not a second person, the second video shows the second person but not the first person, and the camera feed shows both the first and second people. The instructions are also executable to transmit the first video and the second video to a second device different from the first device.

In certain example implementations, the instructions may be executable to segment the camera feed by cropping the camera feed for the first person to be shown in the first video but not the second video and for the second person to be shown in the second video but not the first video. The instructions may also be executable to segment the camera feed by zooming in on the first person for the first video and zooming in on the second person for the second video. Still further, the instructions may be executable to, based on determining to segment the camera feed, add at least one of the first and second people to an attendee list for the video conference, with the added person not being on the attendee list prior to being added.

Additionally, in various example embodiments the instructions may be executable to segment the camera feed responsive to an attendee of the video conference initiating a sharing of the attendee's screen with other members of the video conference. Additionally or alternatively, the instructions may be executable to segment the camera feed responsive to the video conference transitioning from a first stage to a second stage. The first stage may involve a presenter presenting to other attendees of the video conference, and the second stage may involve the other attendees being able to speak after the presenter is done presenting.

Still further, if desired the instructions may be executable to transmit the first video and the second video to the second device and to also transmit the camera feed to the second device. If desired, the instructions may even be executable to control the second device to concurrently present, on a display of the second device, each of the first video, the second video, and the camera feed.

In certain specific examples, the first device may be established by a server that facilitates the video conference. Also in certain specific examples, the camera feed may be received from a single camera in communication with the first device. If desired, the first device may even include the camera.

In another aspect, a method includes splitting up, into first discrete video and second discrete video, a video feed that shows plural participants of a video stream. The first discrete video shows a first participant but not a second participant, the second discrete video shows the second participant but not the first participant, and the video feed shows both the first and second participants. The method also includes transmitting the first discrete video and the second discrete video to a client device that is being used for participation in the video stream.

In certain example implementations, the method may also include controlling the client device to concurrently present, on a single display, the first discrete video and the second discrete video as separate videos.

Also in certain example implementations, the method may include executing facial recognition to identify, from the video feed, the first and second participants. The method may then include, responsive to identifying the first and second participants via facial recognition, determining to split up the video feed and then actually splitting up the video feed responsive to determining to split up the video feed. Additionally, in certain specific instances the method may include accessing metadata about the first and second participants based on identifying the first and second participants via facial recognition and then transmitting the metadata with the first and second discrete videos to the client device. If desired, the method might then include controlling the client device to concurrently present, on a single display, the first discrete video and the second discrete video as separate videos and to also concurrently present the metadata. The metadata may include a name of the first participant and a name of the second participant.

Also if desired, in some example embodiments the video feed may be received from a three-hundred sixty degree camera disposed within a conference room.

In still another aspect, at least one computer readable storage medium (CRSM) that is not a transitory signal includes instructions executable by at least one processor to segment, into first video and second video, a video feed that shows plural participants of a video stream. The first video shows a first participant but not a second participant, the second video shows the second participant but not the first participant, and the video feed shows both the first and second participants. The instructions are also executable to use the first video and the second video as part of the video stream.

If desired, in some example implementations the instructions may be specifically executable to segment the video feed based on identification of a gesture being performed by the first participant as shown in the video feed.

The details of present principles, both as to their structure and operation, can best be understood in reference to the accompanying drawings, in which like reference numerals refer to like parts, and in which:

DETAILED DESCRIPTION

Figure 1:
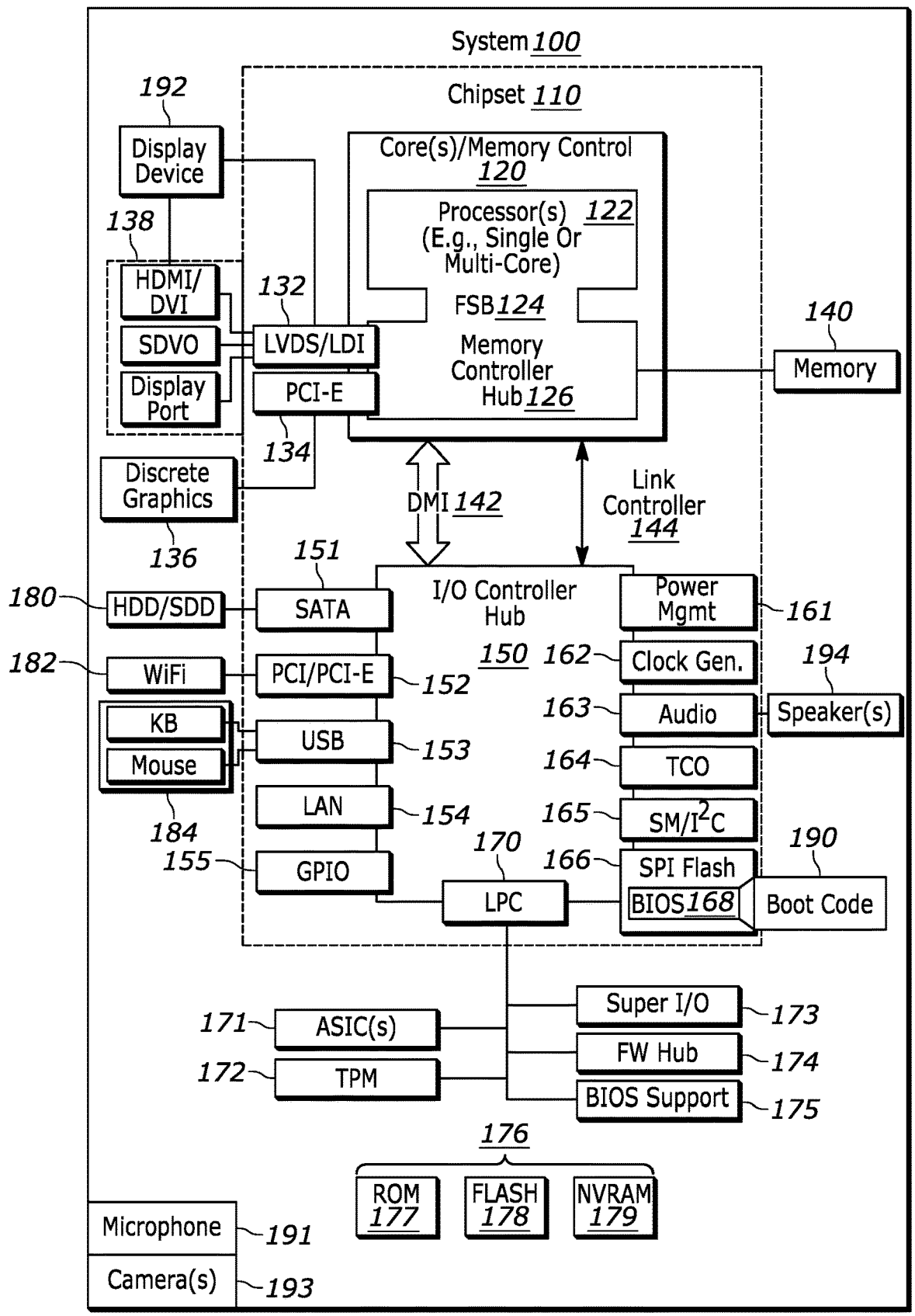
FIG. 1 is a block diagram of an example system consistent with present principles.

Among other things, the detailed description below deals with using a single camera/single image sensor to add multiple attendees individually to a virtual meeting or other type of video conference. Thus, a single video camera feed may be received, and then the feed may be split into multiple video feeds, one for each attendee of the meeting.

For example, if two people are sitting in a conference room, individual video feeds may be created for each of them using a single wall-mounted camera within the conference room. Each individual feed may be cropped and the respective person that is shown may be zoomed-in on. Each individual may also be identified through facial or voice recognition to then present other data about that individual, such as the individual's name. Furthermore, the identified individuals may be added to the meeting's attendee/invite list.

Thus, as one specific example implementation, suppose multiple users singularly dialed in or logged in to a video conference from a single device within a conference room. These users may be identified and then, once the users have been identified, the system may add each user to the video conference separately and show a respective individual live video feed for that person. Thus, with the single camera, cropped live feeds can be created and used for everyone in the room. Furthermore, if one of the users were to leave the room, the device may detect as much (e.g., via facial recognition, presence detection, etc.) and that individual's separate individual video feed may then be removed from the meeting GUI and/or from the meeting list itself (the list possibly indicating current participants as well as viewers of the video conference). What's more, if the table in the conference room has a 360-degree camera in the middle, different image sensor feeds each from a different image sensor within the 360-camera may be selected for each individual user, where that respective feed best shows the user's face based on the respective image sensor from which the respective feed is received having a forward-facing axis toward the user's face. The system may therefore produce a forward-facing, cropped individual live video of each respective user regardless of where the user is seated around the conference table/360-camera itself.

These types of technical features and actions may be activated by default, and/or may be activated based on context. For example, these features and actions may be activated when someone starts sharing their screen with other conference attendees. In such a circumstance, the main base feed from the camera may be reduced in size relative to its prior presentation, and reduced individual videos may be presented for each person from the conference room as well.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone to the processor 122 based on audio that is detected, such as via a user providing audible input to the microphone as part of a video conference consistent with present principles. The system 100 may also include a camera 193 that gathers one or more images and provides the images and related input to the processor 122. The camera may be a digital camera (e.g., with a single image sensor), a three-hundred sixty (360) degree camera with multiple image sensors, a thermal imaging camera, an infrared (IR) camera, a webcam, a three-dimensional (3D) camera, and/or another type of camera otherwise integrated into the system 100 and controllable by the processor 122 to gather still images and/or video during a video conference consistent with present principles.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
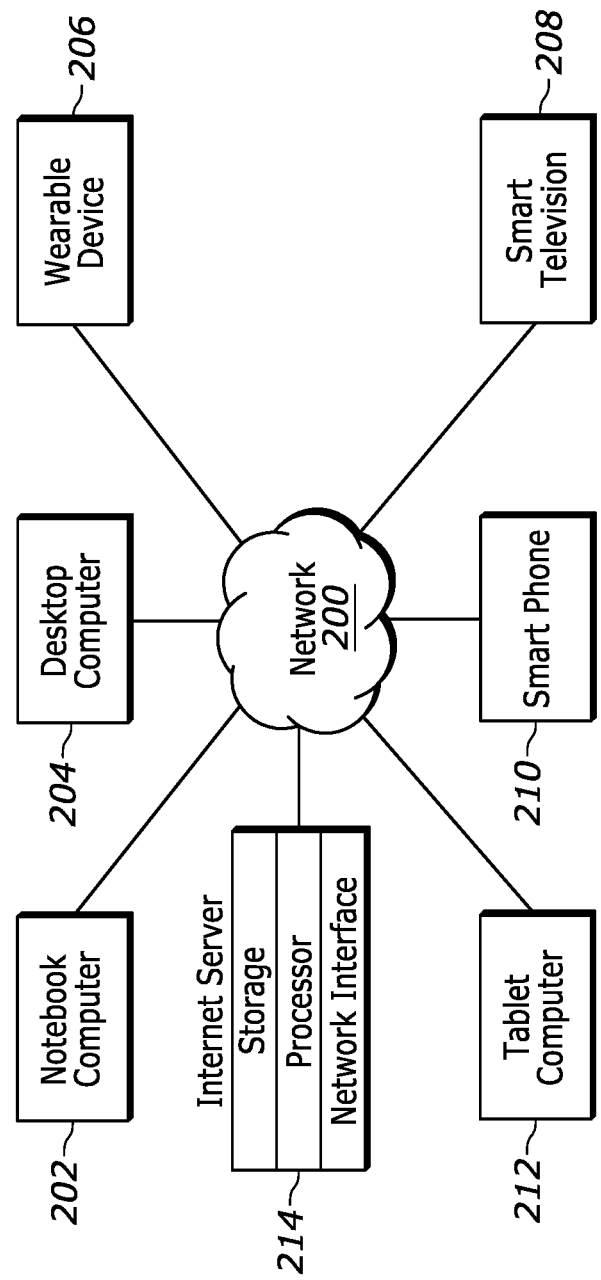
FIG. 2 is a block diagram of an example network of devices consistent with present principles.

Turning now to FIG. 2, example devices are shown communicating over a network 200 such as the Internet to facilitate a video conference consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch or smart glasses, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
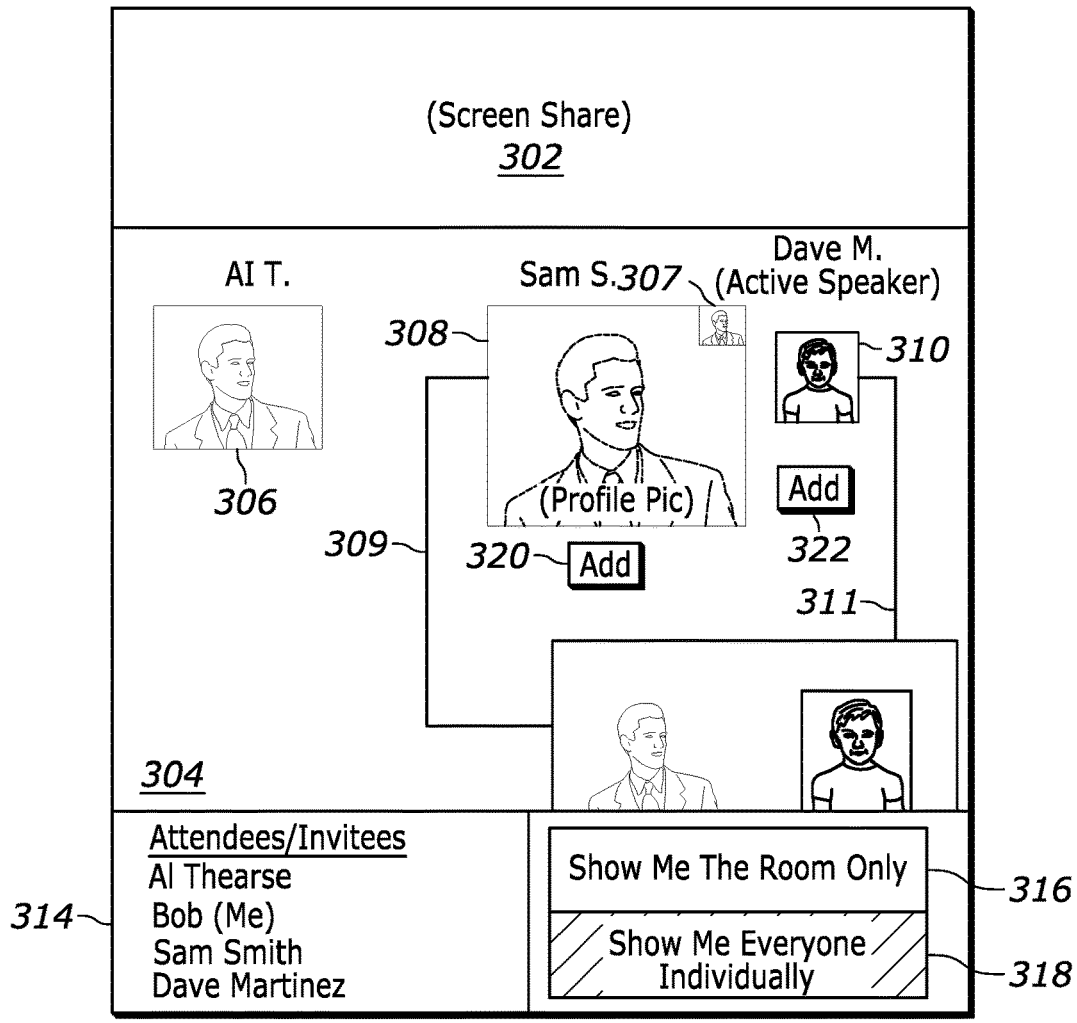
FIG. 3 shows an example video conferencing graphical user interface (GUI) that may be presented on the display of a client device during a video conference consistent with present principles.

Now in reference to FIG. 3, suppose four people are participating in a video conference. Also suppose a first participant and a second participant are each remotely-located from each other as well as from the other participants, while third and fourth participants are co-located in a same conference room (but still remotely-located from the first and second participants). The first and second participants may therefore use their own respective client device to participate in the video conference, transmitting their own local audio/video feeds to others as well as receiving the audio/video feeds of others for local presentation. Meanwhile, the third and fourth participants may be collectively using a single camera and microphone located within the conference room. The single camera and microphone may be attached to a television mounted on a wall within the conference room, to a stand-alone conferencing device placed in the middle of a conference table in the room, to one of the user's smartphones, or to another client device. Regardless, it is to be understood that a single audio video feed from the device is being transmitted to both of the first and second participants, with the single feed showing both of the third and fourth participants speaking and gesturing as part of the conference.

With this in mind, the example graphical user interface (GUI) 300 of FIG. 3 may be presented as a real-time, live video conference screen for the video conference. It may be presented on the display of the first participant's client device, with the first participant being named "Bob" here. The client device itself may be a smartphone, a laptop computer, a wearable headset like smart glasses, etc. As shown in FIG. 3, the GUI 300 may include a main pane 302 in which content from another attendee's client device is being presented/shared as part of the video conference (e.g., a "screen share"). The content might be a slideshow presentation, an Internet browser window, or a word processing document, for example.

The GUI 300 may also include a participant video pane 304 that presents individual, discrete, live real time video feeds of the other participants of the video conference. This includes video 306 of the remotely-located second participant ("Al") as well as video 310 of one of the two participants in the conference room ("Dave Martinez"). Note therefore that the video 310 may be derived from the camera feed 312, with the video 310 being generated using video editing software to both crop and zoom in on the face of Dave Martinez so that Dave's face is centered in the field of view of the video 310 (while excluding other people/ participants located in the conference room) and also enlarged relative to his appearance in the feed 312 itself. As also shown in FIG. 3, not only may the GUI 300 list Dave's name next to the video 310, but if Dave is detected as the one that is currently speaking in the video conference, then beneath Dave's name may be a text indication as shown that Dave is currently the active speaker.

Further note that a similar video feed for the other person in the conference room ("Sam Smith") that was also split off from the feed 312 may be presented on the pane 304. However, certain predetermined circumstances may also trigger a still image to replace the discrete live video of one or more of the people in the conference room. One such trigger for replacing the individual cropped video with a still image is the main camera feed 312 showing the relevant participant (Sam Smith here) from a side profile or rear profile rather than front profile showing his face. This might be detected using facial recognition for example, and without the trigger presenting live video might otherwise result in a sub-optimal view of Sam that does not adequately show his face.

But since the conferencing system has determined that Sam's face is not sufficiently shown in the camera feed 312, in lieu of a cropped live video of Sam Smith as split off from the camera feed 312, the system may instead present a profile picture 308 or avatar of Sam as already loaded into the system prior to the conference (e.g., accessible from Sam's video conferencing profile). And note here that the conferencing system itself may be a platform/application running on a remotely-located coordinating server and/or running on one or more of the participant's own client devices. In any case, the trigger for replacing the live, real time video derived from the feed 312 with a still image may specifically be less than a threshold amount of the person's face being shown, such as less than half, as determined through facial recognition. However, further note that another example trigger for presenting a still image in place of live video may be detection of a network connection problem or bandwidth issue over one of the networks that is being used for the conference (e.g., over a leg of the network between the conference room device and the coordinating server, causing pixelated video in the feed 312 and/or no real-time video being received/available in the first place).

Also note that if desired, in some examples the still image/picture 308 as discretely and separately presented on the GUI 300 may still have segmented real-time video 307 from the feed 312 overlaid as a thumbnail video on a portion thereof. The video thumbnail 307 may therefore show cropped, zoom-in live video of Sam Smith as appearing in the feed 312 to nonetheless help a viewer link the image 308 to the actual person shown in the feed 312.

But further note that regardless of whether live, real-time segmented video or a still image is presented for a given participant shown in the feed 312, graphical traces/links 309 and 311 for the respective participant may be presented on the GUI 300. The links 309, 311 may be anchored at one end to the respective participant as shown in the feed 312 itself and at the other end to the same respective participant's discrete video 308 or 310 to therefore visually link each person as appearing in the base feed 312 to a respective discrete video as broken off from the base feed 312.

What's more, though not shown for simplicity, in some examples a respective indication may be presented next to each video or still image 306, 308, and 310 that indicates, as appropriate, that the respective participant is either remote (Al T. in this example) or co-located in the conference room. If the indication indicates that the respective participant is located in the conference room, the room's name might also be presented as provided by the streaming device within the conference room itself.

As also shown in FIG. 3, the GUI 300 may include an attendee/invitee list 314 that lists all of the current attendees/ participants of the video conference as well as people that were invited but did not actually join. The GUI 300 may further include selectors 316, 318 to toggle between different video layouts for the GUI 300. Thus, selector 316 may be selectable via touch, cursor, or other input for Bob to command his device/the system to only present the camera feed 312 from the camera in the conferencing room rather than also presenting individual, discrete, cropped videos for each of Sam and Dave as described above. However, in the present example, selector 318 is shaded to show that it is currently selected, with the selector 318 itself being selectable to command the device/system to segment the live camera feed 312 into separate cropped live videos individually showing Sam and Dave as shown in FIG. 3 and described above.

Still in reference to FIG. 3, note that although in some example implementations the conferencing system may autonomously identify the identity of both Sam and Dave via facial recognition to then add them to the list 314, other techniques including voice recognition and client device wireless signal identifier may be used to autonomously add the identified person to the list 314 as an attendee/participant. And further note that in some examples an administrator, organizer, or participant of the video conference may instead have to authorize the identified attendee to be added to the list 314 before that person is actually added.

In either case, a participant being dynamically added to the list 314 as described above may be particularly useful where, for example, two users collectively logged in to the video conference using a single conferencing room device and but one of their accounts/profiles (or did not use any personally-linked account/profile to login at all). So only a single participant would otherwise be listed in the list 314, and hence a single entry in the list 314 would confusingly denote only a single participant rather than the multiple people that are in fact present. This in turn can be misleading and even cause digital security issues, with other remotely-located participants potentially being unable to discern who is participating in the video conference in the first place.

Still describing the GUI 300 of FIG. 3, as mentioned above an administrator, organizer, and/or participant may be given the option to add a detected participant to the list 314 before the system actually does so. Accordingly, a respective "add to list" selector 320, 322 may be presented for each participant that has been identified through facial, voice, or other user ID and that has also been determined to not be associated with an individual user account already being used to login to the video conference. Thus, selection of the selector 320 may command the system to add Sam Smith to the attendee/invite list 314, while selection of the selector 322 may command the system to add Dave Martinez to the attendee/invite list 314. Then once added, the names of those respective participants may also be saved to persistent storage as part of the list 314 so that another person might go back later to view people that actually attended the video conference.

Figure 4:
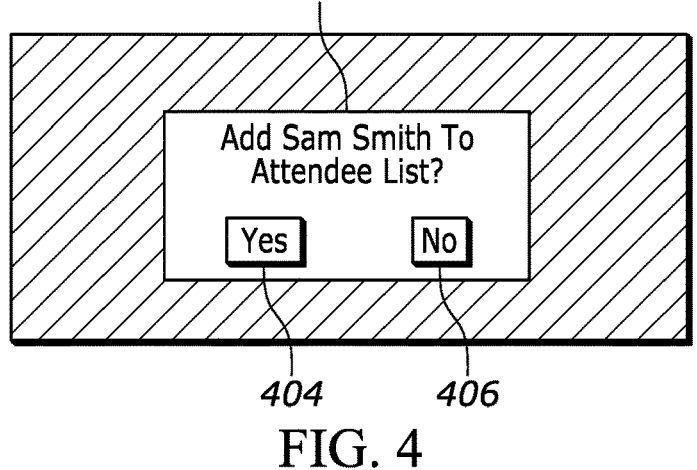
FIG. 4 shows an example GUI that may be presented during the video conference to prompt a user on whether an attendee identified via facial recognition should be added to an attendee list for the video conference.

Further note that in addition to or in lieu of presenting selectors like the selectors 320, 322 on the GUI 300, responsive to a given participant being identified through facial recognition or other means the system may present a pop-up GUI 400 as shown in FIG. 4. The GUI 400 may be overlaid on the GUI 300 during the conference, or the GUI 300 may be removed and the GUI 400 presented in its stead. In either case, as shown in FIG. 4, the GUI 400 may include a text prompt 402 asking whether Sam Smith should be added as an attendee to the list 314. The user may then select the yes selector 404 to command the system to do so, or for whatever reason select the no selector 406 to command the system to decline to do so.

Figure 5:
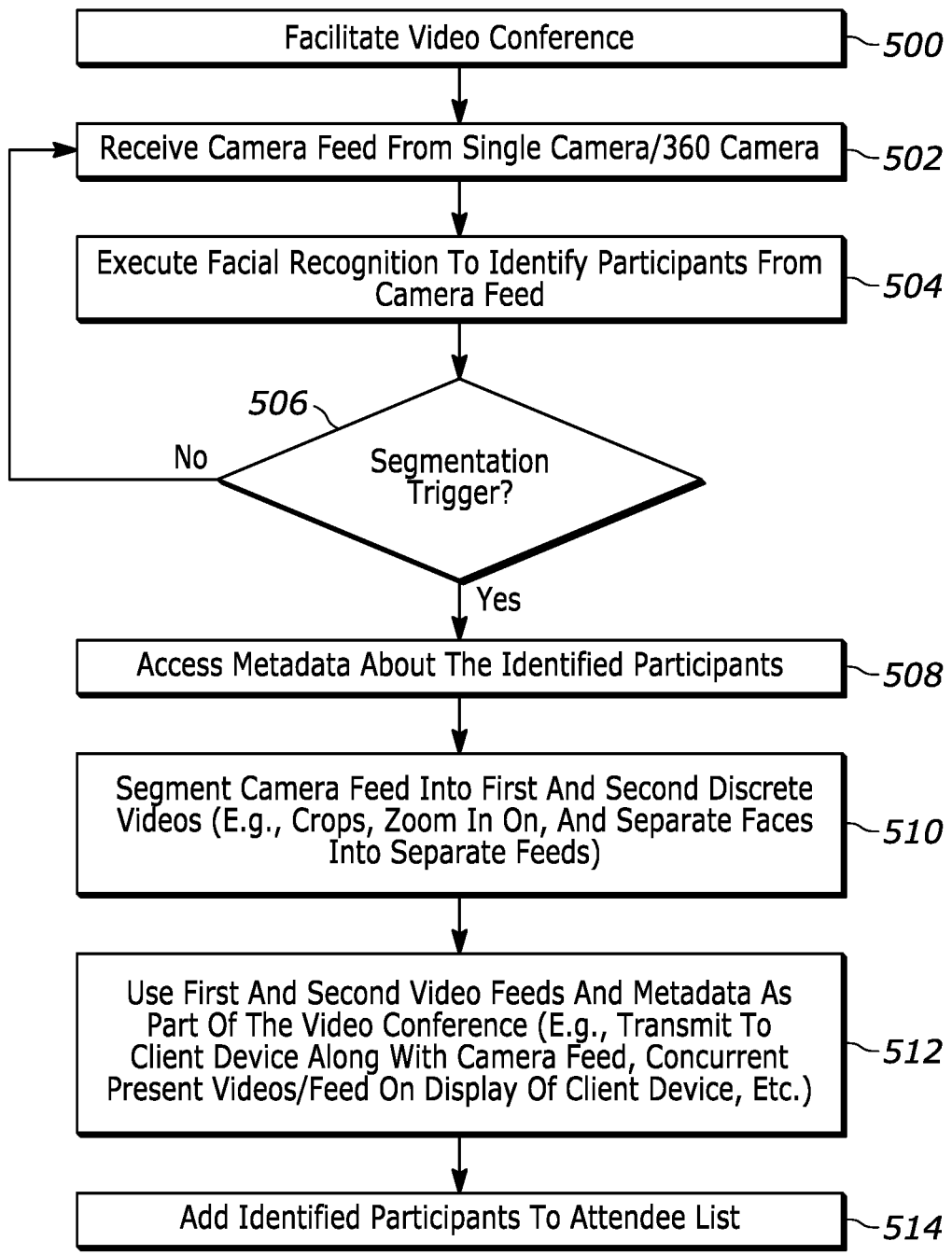
FIG. 5 illustrates example logic in example flow chart format that may be executed by a device consistent with present principles.

Referring now to FIG. 5, example logic is shown that may be executed by a device such as a video conferencing server and/or client device in any appropriate combination consistent with present principles. Note that while the logic of FIG. 5 is shown in flow chart format, other suitable logic may also be used.

Beginning at block 500, the device may facilitate a video conference consistent with present principles. This may include, if the device of FIG. 5 includes a client device, streaming a local video feed from a local camera and a local audio feed from a local microphone to other client devices while also receiving other audio video streams from those other devices for local presentation. This might also include, if the device of FIG. 5 includes a server, routing audio video streams from each participant's client device to the client devices of the other participants so that the other participants can see live real time video and hear live real time audio of each other.

From block 500 the device may then proceed to block 502. At block 502 the device may receive a video feed from a single digital camera/image sensor, and/or from a three-hundred sixty (360) degree camera with multiple image sensors, either of which would be located in a conference room or other shared environment with multiple participants. If a 360-degree camera is used, it may image the environment 360 degrees around the camera in the horizontal plane as part of its field of view. From block 502 the logic may then proceed to block 504.

At block 504 the device may execute facial recognition and/or other user identification techniques to identify one or more participants from the single camera feed/360 degree camera feed as received at block 502. And again note that another user identification technique that may be used is executing voice/speaker recognition using an audio feed from the same client device that is streaming the camera feed itself as received at block 502. From block 504 the logic may then proceed to decision diamond 506.

At diamond 506 the device may determine whether, based on the execution of block 504 and/or other identified factors, one or more triggers have been identified for segmenting the camera feed received at block 502 into separate live videos showing each co-located participant individually as described herein. Such triggers may be used in certain examples instead of presenting the individual live videos by default. One example trigger may be more than one person being identified as co-located in the same environment/ within the same field of view of the camera feed. Another example trigger may be an attendee of the video conference initiating a sharing of the attendee's screen with other members of the video conference.

The trigger might also be the video conference transitioning from a first stage to a second stage. For example, the first stage may involve a presenter (e.g., meeting organizer or designated presenter) presenting audibly and/or visually to other attendees of the video conference, and the second stage may involve the other attendees being able to speak after the presenter is done presenting as might occur in an open comment portion of the video conference or a question and answer part of the video conference. The transition itself might be identified by tracking the current time of day against a set time schedule or agenda for the conference as input into the conferencing system by the organizer to thus determine a stage transition as occurring when the current time of day matches a time in the agenda that a new stage of the video conference is to start. Additionally or alternatively, the transition may be identified by executing natural language understanding (NLU) on the audio feeds of the video conference participants to identify the presenter or another person speaking words indicating a transition from one stage to another (e.g., "Okay, let's open the floor up for questions" or "Does anyone have any comments?").

Another example trigger for diamond 506 may be identification of a gesture being performed by one or multiple participants as shown in the camera feed received at block 502. The gesture may be recognized by executing gesture recognition using the camera feed itself, and the recognized gesture may be set as a predetermined gesture for segmenting the camera feed. For example, predetermined gestures that a system administrator, conference platform, or software developer might set as triggers include a person raising a hand in the air, one person pointing at another person, or even a shoulder shrug. In the specific example implementation where the gesture trigger is one person pointing at another person co-located within the same shared environment, the device may not only split the camera feed into separate discrete live videos for each co-located attendee in response but may also present the video of the person being pointed to as a featured larger/maximized video (e.g., appearing larger and more centrally-located on the GUI 300 than other individual live videos).

A negative determination at diamond 506 may cause the logic to revert back to block 502 and proceed again therefrom. However, an affirmative determination at diamond 506 may instead cause the logic to proceed to block 508 where, in some examples, the device may then access metadata about the participants identified at block 504 (e.g., identified via facial recognition from the camera feed received at block 502). The metadata may indicate information about the respective person, including first and last name as well as contact information such as email address and mailing address and other information that might be presented to other participants (e.g., under the live video for that respective participant on the GUI 300). The metadata may be included in and identified from the initial conference invite or invite list, and/or identified from a history of previous meetings. The metadata may additionally or alternatively be stored in and identified from individual user profiles/accounts for each participant, where the profiles/accounts are identifiable via facial and/or voice ID signature for that respective person. The profiles/accounts may be stored at and hosted by, as examples, the video conferencing platform itself and/or a private organization such as a company with employees participating in the video conference.

From block 508 the logic may then proceed to block 510. At block 510, as part of facilitating the video conference, the device may segment the raw or preprocessed base camera feed received at block 502 (showing multiple participants)

into respective discrete videos for each person shown in the base camera feed. Thus, a first discrete video may be generated to show a first person from the base camera feed but not a second person from the base camera feed. Likewise, a second discrete video may be generated to show the second person from the base camera feed but not the first person from the base camera feed. Other discrete live, real-time videos may also be split off from the base camera feed for each additional person shown in the base camera feed.

The device may perform the segmentation of the base camera feed itself into multiple distinct, separately-presentable videos using video editing software. For example, video editing software may be executed to crop and zoom in on the respective person using the base camera feed so that the person's face is centered in the field of view of the respective discrete video that is generated (while cropping out other people located in the same environment) and also so that the person's face appears larger in the discrete video that is generated relative to his/her appearance in the raw or pre-processed camera feed itself for the same aspect ratio.

From block 510 the logic may then proceed to block 512. At block 512 the device may use the generated, discrete videos and any metadata for the respective people shown in the respective videos (e.g., identified as described above) as part of the video conference itself. This may include transmitting the metadata, the first discrete video, and the second discrete video from the device executing the logic of FIG. 5 to another device such as a server routing audio video streams between client devices and/or one of the client devices themselves. The raw or pre-processed base camera feed received at block 502 may also be transmitted to those devices, and then video conferencing software may be executed locally at each receiving client device to locally present the discrete video, metadata, and possibly even the base camera feed itself.

As another example, at block 512 the device of FIG. 5 may also use the individual live videos and/or metadata as part of the video conference by specifically controlling the receiving client devices themselves through their own local versions of the video conferencing software to concurrently present, on a respective client device's display, the metadata, the first discrete video, the second discrete video, and even the base camera feed itself. Thus, the device executing the logic of FIG. 5 might be a server controlling a client device to concurrently present, on a single client device display and during the video conference, the first discrete video, the second discrete video, and the metadata through its link to the client device's local copy of the video conferencing software.

From block 512 the logic of FIG. 5 may then proceed to block 514. At block 514 the device may, based on determining to segment the camera feed, add the first and second people from the camera feed to an attendee list for the video conference, where the added people may not have been on the attendee list prior to being added at block 514. The current attendee list with the first and second people added to it may then be presented on a conferencing GUI at a client device, such as the GUI 300 described above.

Figure 6:
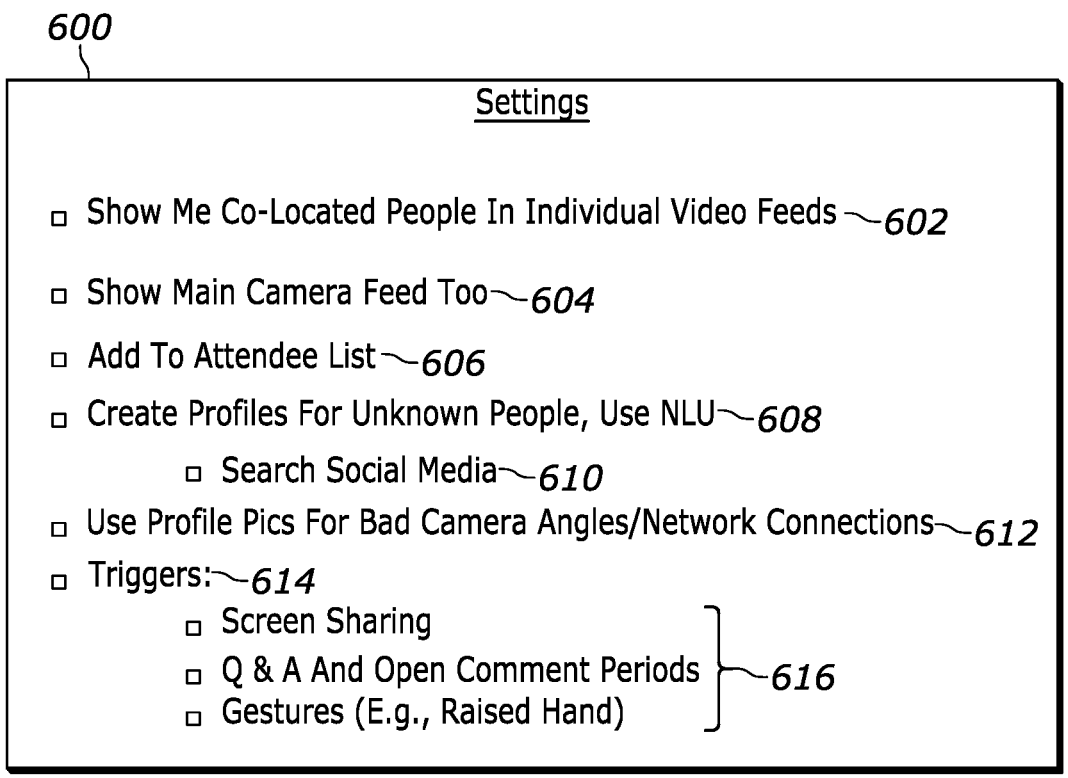
FIG. 6 shows an example settings GUI that may be presented on a device's display to configure one or more settings of the device to operate consistent with present principles.

Now in reference to FIG. 6, it shows an example GUI 600 that may be presented on the display of a client device and/or server to configure one or more settings of the device to undertake present principles. The GUI 600 may be presented based on a user navigating a device or video conferencing application ("app") menu, for example. Also note that each of the example options described below may be selected via touch, cursor, or other input directed to the associated check box per this example.

As shown in FIG. 6, the GUI 600 may include a first option 602 that may be selectable a single time to set/configure the device to, for multiple future video conferences, split up a base video camera feed from a single camera or 360 degree camera into multiple discrete videos showing only one of plural people that are commonly located in a particular video conferencing location. Thus, selection of the option 602 may set or enable the device to undertake the actions described above in reference to the GUIs of FIGS. 3 and 4 as well as to execute the logic of FIG. 5.

As also shown in FIG. 6, the GUI 600 may include an option 604 that may be selectable to specifically set the device to show the raw or pre-processed base camera video feed itself (from which the additional discrete videos were derived) concurrently with the discrete videos when the discrete videos are presented. The user might therefore select this option to still see the wider field of view of the environment itself from the base camera feed while the discrete videos of each individual participant are also separately presented.

FIG. 6 also shows that the GUI 600 may include an option 606. The option 606 may be selectable to set or enable the device to, for each participant for which a discrete video is generated from a base camera feed, add that participant to an attendee list for the video conference itself as described above.

Still further, the GUI 600 may include an option 608 that may be selectable to command the device to create a new user account/profile for a given participant that is identified from a base camera feed but for which no account or profile already exists. This might be particularly useful where certain employees of a certain company video conference with each other regularly and have company profiles accessible to the conferencing system from which those users may be identified, but where another person from a third-party vendor also joins the video conference on a particular day but does not have a company profile/account from which their name and other information may be identified. So with option 608 enabled, a new account/profile may be created for that vendor and may include facial (and/or voice) recognition data for identifying the same person again in the future. The new account/profile may also include a name for the person and still other identifying information. The identifying information itself might be identified for inclusion in the new account/profile if, for example, prior to and as part of joining the video conference the unknown vendor inputs his/her name into the conferencing system. As another example, NLU may be executed on the audio from the video conference to identify the unknown person verbally announcing their own name or other identifying information, such as job title. For example, the unknown user might say something like "Hello, I'm Jim Johnson and I'm a software engineer with XYZ Technologies" and the device may thus execute NLU to identify a name for that person as "Jim Johnson", a job title for that person as "software engineer", and a company with which that person is employed as "XYZ Technologies". All three of those types of metadata may then be presented underneath the discrete video of Jim himself as presented on a GUI like the GUI 300 of FIG. 3.

If desired, the option 608 may be accompanied by a sub-option 610. The sub-option 610 may be selectable to command the device to search social media platforms for metadata about the previously unknown person. For example, a facial recognition algorithm may be executed on the base camera feed to identify facial feature points for the unknown person, and those facial feature points may then be used to match the user's face from the base camera feed to the face of the person as shown in a social media profile picture to thus identify the person's social media profile. The social media profile may then be parsed using NLU and other techniques to identify various types of metadata about the person, which again might include name, place of employment, and job title. And further note that while the sub-option 610 might be specifically selectable to search various social media platforms like Facebook, LinkedIn, and Twitter for such metadata, other sub-options may also be presented for other online sources of information that may also be accessed to identify relevant metadata, including sub-options for company websites, electronic news articles, blog posts, etc.

In some examples, the GUI 600 of FIG. 6 may also include an option 612. The option 612 may be selectable to set or configure the device to, rather than presenting a discrete video split off from a base camera feed for a given user as described above, present a profile picture, avatar, or other type of still image in place of the discrete video based on a certain trigger being met as also described above (e.g., a bad network connection, and/or less than a threshold amount of the person's face being shown in the discrete or base video). Thus, as an example, this feature might be particularly helpful where the camera from which the base feed is received faces the face of one user but faces the back or side of another user's head, and so the latter user may have a clean, front-facing profile picture presented to others instead of a discrete individual video of the side or back of the user's head. And further note that in addition to or in lieu of a profile picture or avatar image for the user, the still image that is presented may be a still frame from the base camera feed itself as cropped and zoomed in on only that person's face (e.g., a cropped still image from the video conference from when the network connection for that user was still good). The still frame itself may be selected for such purposes based on execution of blur detection and/or sharpness detection that indicates sufficient resolution and/or sharp feature boundaries for the person's face as shown in that still frame.

FIG. 6 also shows that in some examples, the GUI 600 may include a setting 614 that may list various triggers for segmenting a base camera feed into multiple discrete and distinct videos in the first place. Each trigger may be listed as a respective option 616, and here the example triggers include a participant initiating a screen share of content as already presented on their own client device's display, a video conference transitioning to a question and answer stage or open comment stage, and a particular gesture being gestured by a given participant as described above.

Moving on from FIG. 6, it is to be understood that present principles may be employed even for video conferences where two or more people call in from a telephone line. Thus, even where a base video feed is not available for those people, voice recognition may be executed on the audio of those people to identify plural distinct people on that end of the line. In response, separate still images like profile pictures may then be presented for each of those identified people on the conferencing GUIs of the other participants (possibly with metadata such as participant name if a profile for that person is identifiable based on the voice recognition result).

What's more, it is to also be understood that in examples where an active speaker's video is dynamically enlarged/presented bigger than non-active speakers, a cropped, zoomed-in on individual live video for a respective participant as segmented from a base camera feed may be used as the video that is enlarged when that participant becomes the active speaker.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   facilitate a video conference;
   as part of facilitating the video conference and responsive to an attendee of the video conference initiating a sharing of the attendee's screen with other members of the video conference, segment a camera feed into first video and second video, the first video showing a first person but not a second person, the second video showing the second person but not the first person, the camera feed showing both the first and second people;
   present a graphical user interface (GUI) on a display, the GUI showing the first video and the second video, the GUI also showing the camera feed in a reduced size compared to the camera feed's presentation on the GUI prior to the initiating of the sharing of the attendee's screen with other members of the video conference.

2. The first device of claim 1, wherein the instructions are executable to:
   segment the camera feed at least in part by cropping the camera feed for the first person to be shown in the first video but not the second video and for the second person to be shown in the second video but not the first video.

3. The first device of claim 2, wherein the instructions are executable to:
   segment the camera feed at least in part by zooming in on the first person for the first video and zooming in on the second person for the second video.

4. The first device of claim 1, wherein the instructions are executable to:
   based on determining to segment the camera feed, add at least one of the first and second people to a text-based attendee list for the video conference, the added person not being on the text-based attendee list prior to being added.

5. The first device of claim 1, wherein the instructions are executable to:
   transmit the first video and the second video to a second device and also transmit the camera feed to the second device.

6. The first device of claim 1, wherein the instructions are executable to:
control a second device to concurrently present, on a display of the second device, each of: the first video, the second video, the camera feed.

7. The first device of claim 1, wherein the first device is established by a server that facilitates the video conference.

8. The first device of claim 1, wherein the camera feed is received from a single camera in communication with the first device.

9. The first device of claim 8, comprising the camera.

10. A method, comprising:
responsive to an attendee of a video stream initiating a sharing of the attendee's screen with other members of the video stream, splitting up, into first discrete video and second discrete video, a video feed that shows plural participants of the video stream, the first discrete video showing a first participant but not a second participant, the second discrete video showing the second participant but not the first participant, the video feed showing both the first and second participants; and
presenting a graphical user interface (GUI) on a display, the GUI showing the first discrete video and the second discrete video, the GUI also showing the video feed in a reduced size compared to the video feed's presentation on the GUI prior to the initiating of the sharing of the attendee's screen with other members of the video stream.

11. At least one computer readable storage medium (CRSM) that is not a transitory signal, the at least one CRSM comprising instructions executable by at least one processor to:
responsive to an attendee of a video stream initiating a sharing of the attendee's screen with other members of the video stream, segment, into first video and second video, a video feed that shows plural participants of the video stream, the first video showing a first participant but not a second participant, the second video showing the second participant but not the first participant, the video feed showing both the first and second participants; and
present a graphical user interface (GUI) on a display, the GUI showing the first video and the second video, the GUI also showing the video feed in a reduced size compared to the video feed's presentation on the GUI prior to the initiating of the sharing of the attendee's screen with other members of the video stream.

12. The CRSM of claim 11, wherein the instructions are executable to:
responsive to determining that the second participant is no longer being shown in the video feed, stop presenting the second video as part of the video stream.

13. The first device of claim 1, wherein the instructions are executable to:
responsive to determining that the second person is no longer being shown in the camera feed, stop transmitting the second video to a second device.

14. The method of claim 10, comprising:
responsive to determining that the second participant is no longer being shown in the video feed, stop presenting the second discrete video on the GUI.

15. The method of claim 10, comprising:
based on determining to split up the video feed, add at least one of the first and second participants to a text-based attendee list for the video stream, the added person not being on the text-based attendee list prior to being added.

16. The method of claim 10, wherein the GUI comprises one or more selectors to toggle between: presenting the first and second discrete videos, and presenting the video feed without concurrently presenting the first and second discrete videos.

17. The method of claim 10, wherein the method is executed by a server facilitating the video stream.

18. The at least one CRSM of claim 11, wherein the instructions are executable to:
based on determining to segment the video feed, add at least one of the first and second participants to a text-based attendee list for the video stream, the added person not being on the text-based attendee list prior to being added.

19. The at least one CRSM of claim 11, wherein the GUI comprises one or more selectors to switch between: presenting the first and second videos, and presenting the video feed without concurrently presenting the first and second videos.

20. The at least one CRSM of claim 11, wherein the at least one processor is at least one processor of a sever that facilitates the video stream.

* * * * *